United States Patent
Cox et al.

(10) Patent No.: US 6,738,814 B1
(45) Date of Patent: May 18, 2004

(54) METHOD FOR BLOCKING DENIAL OF SERVICE AND ADDRESS SPOOFING ATTACKS ON A PRIVATE NETWORK

(75) Inventors: Dennis Cox, Austin, TX (US); Kip McClanahan, Austin, TX (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/040,898

(22) Filed: Mar. 18, 1998

(51) Int. Cl.$^7$ .......................... G06F 15/16; G06F 11/30
(52) U.S. Cl. ........................ 709/225; 713/201; 709/227
(58) Field of Search .......................... 709/229, 225, 709/226, 227, 228; 713/201, 200, 202

(56) References Cited

U.S. PATENT DOCUMENTS

| | | | | |
|---|---|---|---|---|
| 4,672,572 A | * | 6/1987 | Alsberg ........................ 713/202 |
| 4,769,771 A | * | 9/1988 | Lippmann et al. .......... 364/220 |
| 5,003,595 A | * | 3/1991 | Collins et al. ................. 707/9 |
| 5,032,979 A | * | 7/1991 | Hecht et al. ................. 713/201 |
| 5,365,580 A | * | 11/1994 | Morisaki ..................... 379/189 |
| 5,623,601 A | * | 4/1997 | Vu ........................ 395/187.01 |
| 5,682,478 A | * | 10/1997 | Watson et al. .............. 709/229 |
| 5,757,916 A | * | 5/1998 | MacDoran et al. ........... 380/25 |
| 5,757,924 A | * | 5/1998 | Friedman et al. ............. 380/49 |
| 5,781,550 A | * | 7/1998 | Templin et al. ............. 370/401 |
| 5,784,559 A | * | 7/1998 | Frazier et al. ........... 395/200.13 |
| 5,793,951 A | * | 8/1998 | Stein et al. ............ 395/187.01 |
| 5,826,014 A | * | 10/1998 | Coley et al. ........... 395/187.01 |
| 5,828,846 A | * | 10/1998 | Kirby et al. ............ 395/200.68 |
| 5,864,666 A | * | 1/1999 | Shrader .................. 395/187.01 |
| 5,867,647 A | * | 2/1999 | Haigh et al. ................. 395/186 |
| 5,892,903 A | * | 4/1999 | Klaus ..................... 395/187.01 |
| 5,958,053 A | * | 9/1999 | Denker ....................... 713/201 |
| 5,968,176 A | * | 10/1999 | Nessett et al. .............. 713/201 |
| 5,991,881 A | * | 11/1999 | Conklin et al. ............. 713/201 |
| 6,003,030 A | * | 12/1999 | Kenner et al. ................. 707/10 |
| 6,009,475 A | * | 12/1999 | Shrader ....................... 709/249 |
| 6,035,404 A | * | 3/2000 | Zhao .......................... 713/201 |
| 6,061,650 A | * | 5/2000 | Malkin et al. .............. 704/228 |

OTHER PUBLICATIONS

Schuba et al., Analysis of a Denial of Service Attack on TCP, 1997.*
CERT Advisory CA–1996–21 TCP SYN Flooding and IP Spoofing Attacks, Sep. 1996.*
Webpage titled "Keeping Mobile Users Secure" by Dave Kosiur, Feb. 11, 1998.
Webpage titled "After Ping of Death, 'Land' Attack Disables some Mac Systems" by Ric Ford, Feb. 8, 1997.
Webpage titled "How Not to be Victim of the Next Hacker Attack" by Annette Hamilton, Dec. 18, 1996.

* cited by examiner

*Primary Examiner*—Dung C. Dinh
(74) *Attorney, Agent, or Firm*—Baker Botts L.L.P.

(57) ABSTRACT

A method is provided for blocking attacks on a private network (12). The method is implemented by a routing device (10) interconnecting the private network (12) to a public network (14). The method includes analyzing an incoming data packet from the public network (14). The incoming data packet is then matched against known patterns where the known patterns are associated with known forms of attack on the private network (12). A source of the data packet is then identified as malicious or non-malicious based upon the matching. In one embodiment, one of the known forms of attack is a denial of service attack and an associated known pattern is unacknowledged data packets. In another embodiment, one of the known forms of attack is an address spoofing attack and an associated known pattern is a data packet having a source address matching an internal address of the private network (12).

16 Claims, 1 Drawing Sheet

US 6,738,814 B1

METHOD FOR BLOCKING DENIAL OF SERVICE AND ADDRESS SPOOFING ATTACKS ON A PRIVATE NETWORK

TECHNICAL FIELD OF THE INVENTION

This invention relates in general to communication systems, and more particularly to a method for blocking denial of service and address spoofing attacks on a private network.

BACKGROUND OF THE INVENTION

Corporate and other private networks often provide external access outward and inward through Internet gateways, firewalls or other routing devices. It is important for these routing devices to defend the private network against attackers from the outside as well as to allow access to the private network by authorized users. However there are numerous forms of attack on conventional routing device that can incapacitate the devices and interfere with an associated private network. The problem of keeping unauthorized persons from accessing data is a large problem for corporate and other information service management. Routing devices, such as gateways, firewalls and network routers lack important safeguards to block or prevent attacks. In particular, the number of denial service attacks have risen dramatically in recent years. Further, IP spoofing incidents occur with increasing frequency.

A denial of service attack consists of repeatedly sending requests for connections to different hosts through and/or behind the routing device. Typically, the host will wait for acknowledgment from the requester. Because a host can only handle a finite number of requests (for example, 1 to n, where n depends on the resources available to the host), the attacker can crash or "flood" a host with requests to the point of disrupting network service (host/server/port) to users.

Another form of attack is address spoofing which can be used by unauthorized third parties to gain access to a private network. This attack involves the attacker identifying a valid internal network :address within the private network. The attacker then requests access to the private network through the routing device by spoofing that internal network address. Conventional routing devices typically are not sophisticated enough to determine that such a request should be denied (i.e., because an external request can not originate from an internal address) and will allow access to the attacker. Address spoofing attacks can be carried out against various types of networks and network protocols such as IPX/SPX, MAC layer, Netbios, and IP.

It is therefore advantageous to provide facilities within a routing device that block denial of service, address spoofing and other attacks on an associated private network.

SUMMARY OF THE INVENTION

In accordance with the present invention, a method for blocking denial of service and address spoofing attacks on a private network is disclosed that provides significant advantages over conventional network routing devices.

According to one aspect of the present invention, the method is implemented by a routing device interconnecting the private network to a public network. The method includes analyzing an incoming data packet from the public network. The incoming data packet is then matched against known patterns where the known patterns are associated with known forms of attack on the private network. A source of the data packet is then identified as malicious or non-malicious based upon the matching. In one embodiment, one of the known forms of attack is a denial of service attack and an associated known pattern is unacknowledged data packets. In another embodiment, one of the known forms of attack is an address spoofing attack and an associated known pattern is a data packet having a source address matching an internal address of the private network.

A technical advantage of the present invention is the enabling of a routing device to the identify a denial of service attack and to block such an attack from tying up the routing device.

Another technical advantage of the present invention is enabling a routing device to identify an address spoofing attack and to block such an attack.

A further technical advantage of the present invention is an ability for the routing device to track information about the attacker to allow preventive measures to be taken.

Other technical advantages should be readily apparent to one skilled in the art from the following figures, description, and claims.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Figure 1:
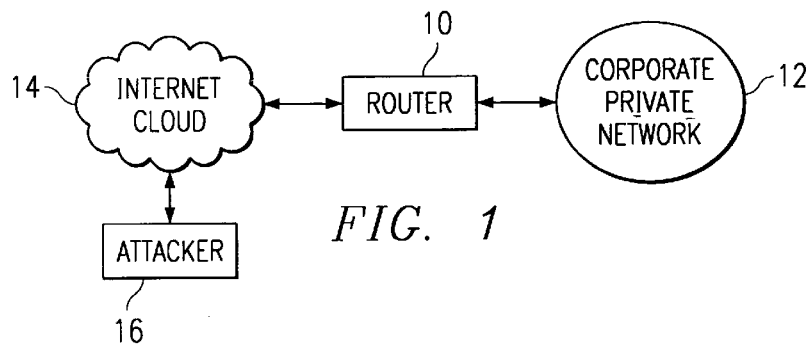
FIG. 1 is a block diagram of an communication system including a routing device and an associated private network.

FIG. 1 is a block diagram of an communication system including a routing device 10 and an associated private network 12. Routing device 10 provides a connection between corporate private network 12 and an Internet cloud 14. Routing device 10 can include a gateway, firewall or other device interconnecting private network 12 and Internet cloud 14. In operation, routing device 10 allows internal users within private network 12 to gain access to Internet cloud 14. Routing device 10 also allows external users connected to Internet cloud 14 to gain access to private network 12. A significant and growing problem is that an attacker 16 may try to gain access to or disrupt private network 12 through Internet cloud 14.

Denial of service and address spoofing are two common forms of attack that might be used by attacker 16. In general, a denial service attack is one in which attacker 16 attempts to prevent others from using private network 12. A denial service attack works if routing device 10 spends all of its time processing requests and cannot respond quickly enough to satisfy additional requests. An Address spoofing attack is on in which attacker 16 fakes an internal address to get around or into standard address filtering schemes. According to the present invention, routing device 10 is enabled with a method for blocking these and other types of attacks by analyzing incoming data packets.

Thus, one possible occurrence is that attacker 16 will try to get into private network 12 by spoofing an address that exists inside private network 12. This is intended to allow attacker 16 to gain access and impersonate an internal user. When a packet from attacker 16 reaches routing device 12, an attack blocking component, according to the present invention, will notice that the address matches one that exists within private network 12. Because incoming packets should not be the same as outgoing packets, the attack blocking component can deny access to private network 12 and record the information about the attack for use by the system administrator. Attacker 16 can also try to deny access to all external users by conducting a denial of service attack. This involves attacker 16 flooding private network 12 or routing device 10 by sending an extremely large number of packets. For example, attacker 16 may send 30,000 or more packets. According to the present invention, the attack blocking component of routing device 10 can notice that the first packet is spoofed or that it cannot be acknowledged and ignore all other packets. Further, routing device 10 can use diagnostic detection tools (e.g., trace root, ping, NS lookup) to pinpoint attacker 16 and notify the system administrator. In general, according to the present invention, routing device 10 can be enabled to intelligently analyze incoming packets, match the packets against known patterns for attack strategies and respond accordingly to malicious packets.

Figure 2:
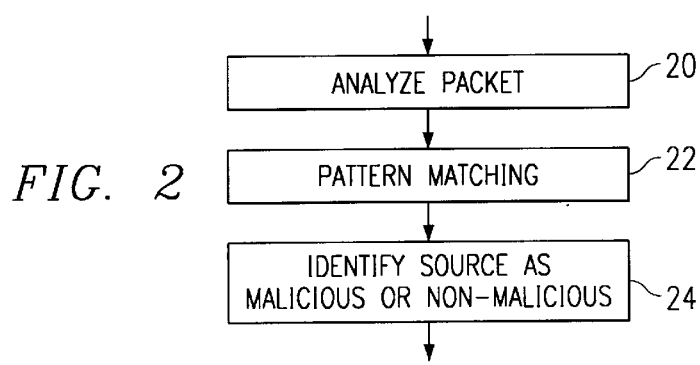
FIG. 2 is a flow chart of one embodiment of a method for blocking attacks on a private network according to the present invention.

FIG. 2 is a flow chart of one embodiment of a method for blocking attacks on a private network according to the present invention. As shown, an incoming packet is analyzed by the routing device in step 20. In step 22, the routing device analyzes the incoming packet against known patterns. Based upon this pattern matching, in step 24, the routing device can identify the data packet and its source as malicious or non-malicious. The known patterns used in step 22 can be built using knowledge about various types of attacks. This knowledge can be recorded in the form of patterns that are then stored in a database or other storage device accessible by the routing device. The routing device can then match the analyzed packets against the patterns to determine whether or not some type of attack is being made. If an attack is identified, the routing device can identify the source of that packet as malicious and treat the source accordingly.

Figure 3:
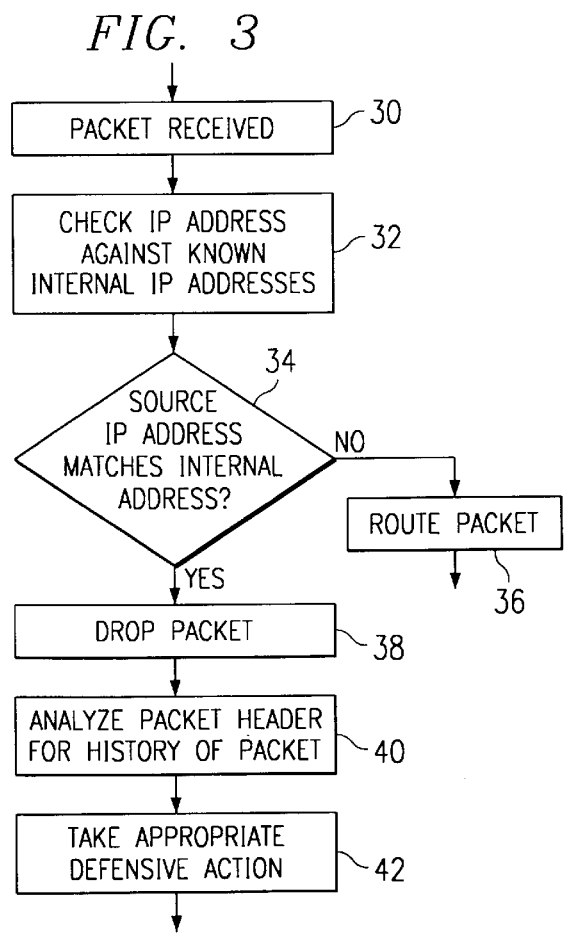
FIG. 3 is a flow chart of one embodiment of a method for blocking an address spoofing attack according to the present invention.
Figure 4:
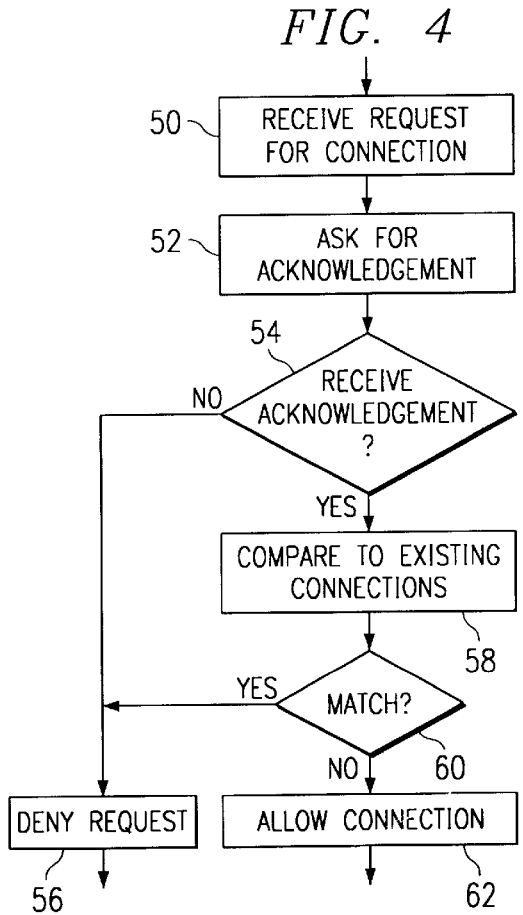
FIG. 4 is a flow chart of one embodiment of a method for blocking a denial of service attack according to the present invention.

In particular, the routing device can implement methods for blocking denial of service attacks and address spoofing attacks as shown, for example, in FIGS. 3 and 4. FIG. 3 is a flow chart of one embodiment of a method for blocking an address spoofing attack according to the present invention. This method is applicable to address spoofing attacks on various types of networks, but is described speficially with respect to an IP network.

As shown in step 30 of FIG. 3, the routing device receives a packet. In step 32, the routing device compares the IP address of the packet against known internal IP addresses of the associated private network. In step 34, the routing device determines if the source IP address matches an internal address. If not, in step 36, the routing device routes the packet as appropriate for the packet. However, if the source IP address matches an internal address, then the routing device identifies that there is an attempt to spoof an internal address. The addressed is known to be spoofed because an internal IP address of the private network cannot be accessing the private network from an external point. Consequently, in step 38, the routing device drops the packet and does not route it to the network. In step 40, the routing device analyzes the packet header for the history of the packet in order to obtain some information about the source of the packet. Then, in step 42, the routing device takes an appropriate defensive action against that packet. For example, the routing device can refuse to accept any more packets from the real source of the packet. In this case, the defensive action can include adding the offending IP address to a cache of IP addresses and then not allowing access to the router device for any IP address in the cached list. Further, the routing device can store information about the attack for later use and for analysis for administrators of the private network. For example, information concerning the packet origination, destination or content can be stored internally to the router device or sent to a syslog server for later analysis.

FIG. 4 is a flow chart of one embodiment of a method for blocking a denial of service attack according to the present invention. As shown, in step 50, the routing device receives a request for a connection. Then, in step 52, the routing device asks for an acknowledgment from the requester. In step 54, the routing device checks whether or not an acknowledgment has been received. If one is not received within a specified period of time, the routing device moves to step 56 and denies the request. This denial ensures that the routing device does not churn on pending requests even though acknowledgments have not been received within reasonable amounts of time.

If an acknowledgment is received in step 54, the routing device moves to step 58 and compares the requested connection to existing connections. Then, in step 60, the routing device determines if there is a match between the requested connection and one of the existing connections. If so, the routing device moves to step 46 and denies the request. The request is denied because one source should not have more than one connection through the routing device to the private network. If, in step 60, there is no match, then the routing device can allow the connection in step 62. The method of FIG. 4 prevents the routing device from being tied up by multiple requests from one source and thereby blocks the denial of service attack.

In general, the method of the present invention can be integrated as a component of a gateway, firewall or other routing device. In one implementation, the present invention can work off of a variable size cache file that holds network addresses. For blocking spoofing, each incoming address can be held in the cache file and checked to see if the incoming address matches an network address that is on the private network. If the incoming address matches, then the request can be denied. Also, a message can be sent to a system log which, rather than being written to a file, can be written to a console to prevent the log from getting overloaded and crashing the routing device. Further, an optional E-mail message or page can be sent to a specified address or number in the case of an attack. If an attack happens more than once on the same address in the span of a certain period of time (for example, five minutes), then the number of messages can be limited to prevent overloading of the Email or paging service. An optional shutdown mechanism can also be in place that will enable the routing device to automatically shut down certain services if attacks continued.

Denial of service attacks are generally easier to trace. However, when such an attack is also spoofed, the problem becomes very difficult to stop. According to the present invention, an incoming address can be checked against the cache file and a quick search can be performed to see if the address is already in a list of pending addresses. If so, the request packet can be discarded. An address is removed from the list if a successful acknowledge packet is sent back or a variable time limit is reached. The number of matching addresses that are allowed in the list can be a variable set by the system administrator.

Although the present invention has been described in detail, it should be understood that various changes, substitutions and alterations can be made thereto without departing from the sphere and scope of the invention as defined by the appended claims.

What is claimed is:

1. A method for blocking an attack on a private network implemented by a routing device interconnecting the private network to a public network, comprising:

receiving a request to establish a communication connection between an endpoint of a public network and an endpoint of a private network;

requesting an acknowledgment from the endpoint of the public network;

determining whether an acknowledgment has been received within a predetermined amount of time;

if an acknowledgment is received, comparing the request to establish a communication connection with existing connections; and if an existing communication connection between the endpoint of the public network and the endpoint of the private network already exists, denying the request to establish a communication connection.

2. The method of claim 1, wherein the public network is the Internet.

3. The method of claim 2, wherein the routing device is a firewall providing access to the Internet.

4. The method of claim 1, further comprising using diagnostic detection tools to determine additional information about the source of the request.

5. The method of claim 4, further comprising forwarding the additional information to a system administrator via electronic mail.

6. The method of claim 1, further comprising denying the request if an acknowledgement is not received.

7. The method of claim 1, further comprising allowing the connection and routing packets to the private network if there is not a match between the request and an existing connection.

8. The method of claim 1, further comprising adding an IP address of the endpoint of the public network to a cache of IP addresses if there is a match.

9. The method of claim 8, further comprising denying access through the routing device to any IP address on the cache of IP addresses.

10. The method of claim 1, further comprising storing information about the request for connection on a system log for analysis by the system administrator.

11. The method of claim 1, further comprising using diagnostic tools to determine additional information about a source of the request for connection.

12. The method of claim 11, wherein using diagnostic tools to determine additional information about a source of the request for connection comprises using trace root diagnostic tools to determine the additional information about the source of the request for connection.

13. The method of claim 11, wherein using diagnostic tools to determine additional information about a source of the request for connection comprises using ping diagnostic tools to determine the additional information about the source of the request for connection.

14. The method of claim 11, wherein using diagnostic tools to determine additional information about a source of the request for connection comprises using NS lookup diagnostic tools to determine the additional information about the source of the request for connection.

15. The method of claim 1, further comprising:

comparing a source address of the request for connection with known internal addresses of the private network;

determining if the source address matches a known internal address; and refusing to process the request for connection if there is a match.

16. A method for blocking an attack on a private network implemented by a routing device interconnecting the private network to a public network, comprising:

receiving a request for connection from an initiator, over the public network;

requesting an acknowledgment from the initiator of the request;

determining whether the acknowledgment has been received within a predetermined denying the request if the acknowledgment is not received within the predetermined comparing the request for connection with existing connections to determine if there is a match; and if there is a match, denying the request for connection.

\* \* \* \* \*

UNITED STATES PATENT AND TRADEMARK OFFICE
CERTIFICATE OF CORRECTION

PATENT NO. : 6,738,814 B1
DATED : May 18, 2004
INVENTOR(S) : Dennis Cox et al.

It is certified that error appears in the above-identified patent and that said Letters Patent is hereby corrected as shown below:

Column 6,
Line 41, after "predetermined" insert -- amount of time; --
Lines 42-43, after "predetermined" insert -- amount of time; --

Signed and Sealed this

Twenty-eighth Day of September, 2004

JON W. DUDAS
*Director of the United States Patent and Trademark Office*